United States Patent
Miller et al.

(10) Patent No.: US 11,146,401 B2
(45) Date of Patent: Oct. 12, 2021

(54) SOFTWARE AUTHENTICATION BEFORE SOFTWARE UPDATE

(71) Applicant: FORD GLOBAL TECHNOLOGIES, LLC, Dearborn, MI (US)

(72) Inventors: Jason Michael Miller, Woodhaven, MI (US); Xin Ye, Westland, MI (US); Aldi Caushi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 916 days.

(21) Appl. No.: 15/233,708

(22) Filed: Aug. 10, 2016

(65) Prior Publication Data
US 2018/0048473 A1    Feb. 15, 2018

(51) Int. Cl.
| | |
|---|---|
| *H04L 9/32* | (2006.01) |
| *H04L 29/08* | (2006.01) |
| *H04L 29/06* | (2006.01) |
| *G06F 21/57* | (2013.01) |
| *H04W 12/069* | (2021.01) |
| *H04L 9/00* | (2006.01) |
| *H04L 9/14* | (2006.01) |
| *H04L 9/30* | (2006.01) |
| *H04W 12/04* | (2021.01) |
| *H04W 8/24* | (2009.01) |
| *G06F 8/65* | (2018.01) |

(52) U.S. Cl.
CPC ............ *H04L 9/3247* (2013.01); *G06F 21/57* (2013.01); *H04L 9/006* (2013.01); *H04L 9/14* (2013.01); *H04L 9/30* (2013.01); *H04L 63/06* (2013.01); *H04L 63/061* (2013.01); *H04L 63/08* (2013.01); *H04L 67/34* (2013.01); *H04W 12/04* (2013.01); *H04W 12/069* (2021.01); *G06F 8/65* (2013.01); *H04L 2209/80* (2013.01); *H04L 2209/84* (2013.01); *H04W 8/245* (2013.01)

(58) Field of Classification Search
CPC ......... H04L 9/3247; H04L 9/006; H04L 9/14; H04L 63/08; H04L 2209/80; G06F 8/65; H04W 12/04; H04W 12/06
USPC .......................................................... 713/176
See application file for complete search history.

(56) References Cited

U.S. PATENT DOCUMENTS

| | | |
|---|---|---|
| 7,366,589 B2 | 4/2008 | Habermas |
| 8,856,536 B2 | 10/2014 | Rabadi et al. |
| 9,269,203 B2 | 2/2016 | Peirce |

(Continued)

OTHER PUBLICATIONS

Kevin Daimi; Securing Vehicle ECUs Update Over The Air; AICT-2016; p. 45-50.*

(Continued)

*Primary Examiner* — Monjur Rahim
(74) *Attorney, Agent, or Firm* — Michael J. Spenner; Brooks Kushman P.C.

(57) ABSTRACT

A programming session may be initiated to a vehicle ECU by an update device. A software update for the ECU may be authenticated by the update device using an authentication key. When an authentication result indicates successful authentication, the ECU software update is sent by the update device over the in-vehicle network to the ECU. The ECU may then flash a memory with the ECU software update. The authentication key may be obtained from the ECU. The update device may be a vehicle telematics control unit or a service tool coupled to a connector of the vehicle.

21 Claims, 4 Drawing Sheets

(56) References Cited

U.S. PATENT DOCUMENTS

| | | | | |
|---|---|---|---|---|
| 2004/0054952 A1* | 3/2004 | Morrow | G06F 11/006 | 714/742 |
| 2005/0256614 A1* | 11/2005 | Habermas | G06F 8/65 | 701/1 |
| 2006/0259207 A1* | 11/2006 | Natsume | G06F 8/65 | 701/1 |
| 2009/0126028 A1* | 5/2009 | Traenkenschuh | G06F 21/572 | 726/30 |
| 2011/0320089 A1* | 12/2011 | Lewis | G01C 21/32 | 701/29.6 |
| 2013/0159717 A1* | 6/2013 | Rabadi | G06F 21/572 | 713/176 |
| 2014/0075517 A1* | 3/2014 | Alrabady | G06F 21/572 | 726/4 |
| 2014/0114497 A1* | 4/2014 | Miyake | H04L 9/32 | 701/1 |
| 2015/0019068 A1* | 1/2015 | Peirce | H04L 67/125 | 701/31.5 |
| 2015/0095997 A1* | 4/2015 | Mabuchi | H04L 67/12 | 726/6 |
| 2015/0172298 A1* | 6/2015 | Otsuka | H04L 63/123 | 726/30 |
| 2015/0180840 A1* | 6/2015 | Jung | H04L 9/0825 | 713/150 |
| 2016/0315766 A1* | 10/2016 | Ujiie | H04L 9/08 | |
| 2017/0324558 A1* | 11/2017 | Takemori | H04L 9/3226 | |

OTHER PUBLICATIONS

Weimerskirch, André, "Secure Software Flashing," 2008 SAE International (4 pages).

* cited by examiner

SOFTWARE AUTHENTICATION BEFORE SOFTWARE UPDATE

TECHNICAL FIELD

The present disclosure relates to software updates for a vehicle, and in particular to performing software authentication before performing software updates.

BACKGROUND

In-vehicle software may utilize various security measures, as installation of unauthorized software may be undesirable. A commonly used measure is the application of a digital signature scheme to ensure that the software is authentic and has not been tampered with. When in-vehicle Electronic Control Unit (ECU) software is ready for update, the update procedure may include flashing the ECU with the new software, and then authenticating the newly installed software using the ECU.

SUMMARY

In one or more illustrative embodiments, a method for updating software for an Electronic Control Unit (ECU) of a vehicle includes initiating a programming session of a vehicle electronic control unit (ECU) by an update device in communication with the ECU over a vehicle bus; authenticating a software update to be installed to the ECU by the update device using an authentication key received from the ECU; and responsive to successful authentication, sending the software update from the update device over the vehicle bus to be applied to the ECU.

The method may further include requesting the authentication key over the vehicle bus from the ECU by the update device; and validating a checksum of the software update by the ECU responsive to receipt of the software update by the ECU. The method may further include generating a notification indicating a result of the authenticating. The authenticating may include authenticating a digital signature of the software update using the authentication key, the authentication key being a public key, the digital signature being applied to the software update by an originator of the software update using a private key corresponding to the authentication key.

The method may further include determining an updated version of the ECU software update; determining a current version of the ECU software that is currently installed in the ECU; comparing the updated version with the current version to obtain a comparison result; and based on the comparison result, deciding whether to send the authentication key from the ECU to the flashing apparatus. The method may further include comprising outputting a message based on the comparison result. The method may further include requesting an authentication key from the ECU by the update device in response to an update version of the software update not matching a current version of the software installed in the ECU.

The flashing apparatus may be connected to an in-vehicle network of the vehicle using an On-Board Diagnostic 2 (OBD2) connector. The method may further include receiving the ECU software update using a Telematics Control Unit (TCU) over a wireless network. The flashing apparatus may be the TCU.

In one or more illustrative embodiments, a vehicle system includes a Telematics Control Unit (TCU) connected to an in-vehicle network, configured to receive a software update for an Electronic Control Unit (ECU) over a wireless network; initiate a programming session with the ECU via the in-vehicle network; authenticate the software update using an authentication key received from the ECU via the in-vehicle network to obtain an authentication result; and responsive to the authentication result indicating successful authentication, send the software update over the in-vehicle network to the ECU to cause the ECU to flash a memory of the ECU with the software update.

The TCU may be further configured to obtain the authentication key from the ECU from a memory of the TCU, wherein the authentication key is stored to the memory from application of a previous software update from the TCU to the ECU. The TCU may be further configured to display a notification indicating the authentication result. The TCU may be further configured to authenticate a digital signature of the software update using the authentication key, the authentication key being a public key, the digital signature being applied to the software update by an originator of the software update using a private key corresponding to the authentication key.

The TCU is further configured to determine an update version of the software update before receiving it; determine a current version of software that is currently installed in the ECU; compare the update version with the current version to obtain a comparison result; and based on the comparison result, decide whether to receive the software update. The TCU may be further configured to reject the software update in response to an update version of the software being incompatible with a current version of the software installed in the ECU. The wireless network may be at least one of a cellular network, a Wi-Fi network, or a Bluetooth network.

In one or more illustrative embodiments, an apparatus for flashing of software for an Electronic Control Unit (ECU) of a vehicle includes a connector configured to couple the apparatus to an in-vehicle network of the vehicle; a memory configured to store an Electronic Control Unit (ECU) software update; and a processor configured to initiate a programming session to the ECU via the connector; authenticate the ECU software update using an authentication key to obtain an authentication result; and when the authentication result indicates successful authentication, send the ECU software update over the in-vehicle network to the ECU to cause the ECU to flash with the ECU software update.

The apparatus may further include a communication device configured to download the ECU software update. The processor may be further configured to authenticate a digital signature of the software update using the authentication key, the authentication key being a public key, the digital signature being applied to the software update by an originator of the software update using a private key corresponding to the authentication key. The processor may be further configured to determine to obtain the authentication key from the ECU responsive to determining that a version of the ECU software update is greater than a current version of the software installed to the ECU.

The details of one or more implementations are set forth in the accompanying drawings and the description below. Other features and advantages will become apparent from the description, the drawings, and the claims.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle ECUs have limited computing resources, such as limited memory and processing power. These limitations may increase the difficulty of implementing resource-intensive security measures, such as public key infrastructure, inside the ECU. In addition, when software updates are authenticated after software has been installed to the ECU, such a system limits the ability of the ECU to continue operation if the software update fails authentication. Instead if the authentication fails, the system may instead restart the update process and attempt a further flash of the software into the ECU. This may be inefficient, and the ECU may fail to boot properly if the update process fails. Moreover, unauthentic software may be installed to the ECU without having been verified before installation.

An improved ECU software update procedure may be performed by a service tool that is connected to an in-vehicle network, such as a Controller Area Network (CAN), via a diagnostic connector such as an On-Board Diagnostic 2 (OBD2) port. Alternatively, the service tool may be connected to the in-vehicle network via other wired and/or wireless connections, such as via USB, Blue Tooth, Wi-Fi, satellite and/or any other means that is configured to connect to the in-vehicle network. The service tool may be a computer having necessary software loaded thereon. If the update is successful, the service tool may finish the process and notify the user about the success of the update. If the update fails at any steps, the update is suspended and the user/technician is notified about the status of the update. The user may decide what to do next.

In an alternative example, the in-vehicle system may include a Telematics Control Unit (TCU). The TCU may be configured to download the ECU software update from a software repository via a wireless connection, such as wirelessly via a cellular network. Responsive to completion of the download, the in-vehicle system may inform the user with respect to the availability of the update, and may request consent from a user to perform the update. The consent may be requested via a user interface, such as a Human-Machine Interface (HMI) of the vehicle. Alternatively, the in-vehicle system may perform the update automatically at an appropriate time, such as when the vehicle is parked or keyed off. Success, failure, or other status information regarding the update may be provided to the user through the user interface. Further aspects of the disclosure are described in further detail herein.

Figure 1:
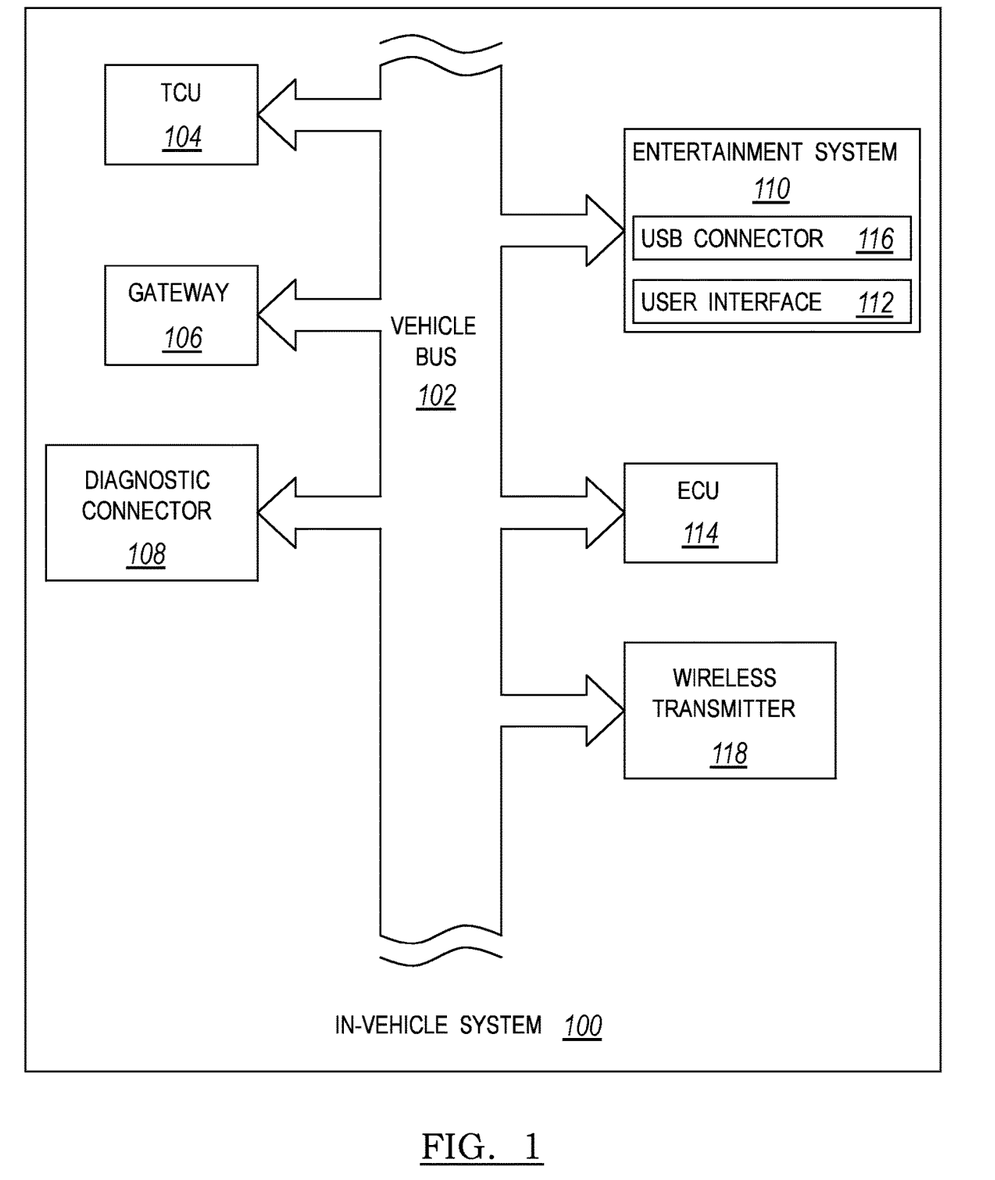
FIG. 1 illustrates an exemplary in-vehicle system of one embodiment of the present disclosure.

FIG. 1 illustrates an exemplary in-vehicle system 100 of one embodiment of the present disclosure. As illustrated, the in-vehicle system 100 includes an in-vehicle network 102, a TCU 104, a gateway device 106, a diagnostic connector 108, an infotainment system 110, a user interface 112, one or more ECUs 114 (only one shown for clarity), an USB connector 116, and a wireless transceiver 118. The in-vehicle network 102 may be configured to connect other devices of the in-vehicle system 100. As some examples, the in-vehicle network 102 may be a CAN, an Ethernet network, or a media oriented system transfer (MOST). The infotainment system 110 may include a user interface 112. As an example, the user interface 112 may include a display screen, a touch screen, a set of segmented displays, and one or more buttons or other controls. The USB connector 116 may provide for connection of storage devices to the infotainment system 110. It should be noted that the modularization of the in-vehicle system 100 is merely exemplary, and more, fewer, and/or different partitioned in-vehicle system 100 devices may be used. In one example, the gateway device 106 may be an ECU configured to connect and transfer messages between different system buses, such as message interworking between high speed CAN, low speed CAN, and/or Ethernet. In some examples, the gateway device 106 may be an external device that is connected to the vehicle through the diagnostic connector 108. The diagnostic connector 108 may be, for instance, an OBD2 connector.

Figure 2A:
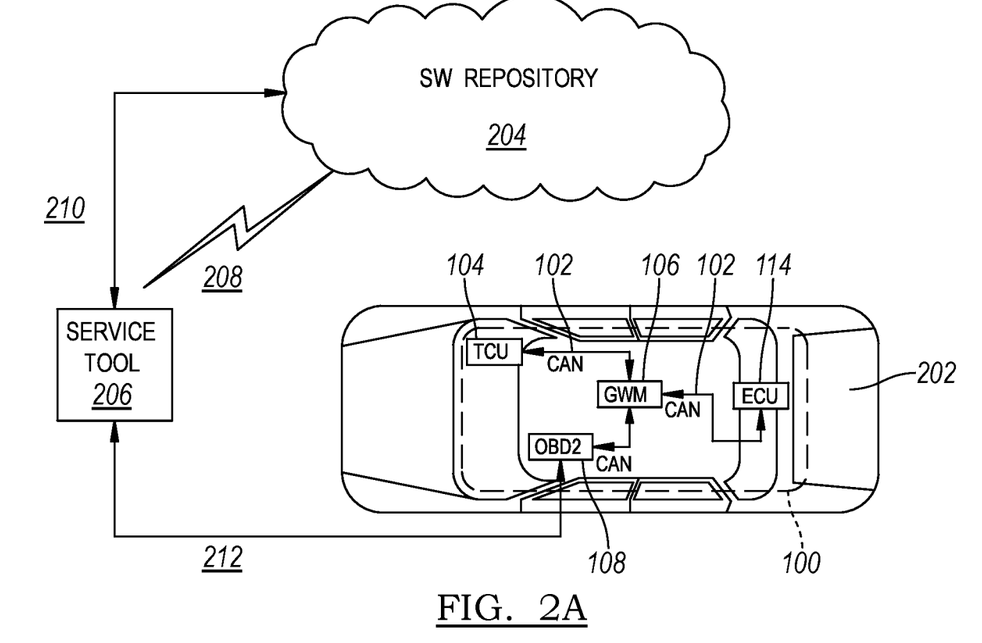
FIG. 2A illustrates an exemplary topology diagram of the in-vehicle system configured to perform an ECU update of one embodiment of the present disclosure.

FIG. 2A illustrates an example topology diagram of the in-vehicle system 100 configured to perform an ECU update. In the system 100, the diagnostic connector 108 is connected to the gateway device 106 via the in-vehicle network 102. Moreover, the gateway device 106 is connected to the ECU 114 via the in-vehicle network 102.

A service tool 206 may be configured to provide software updates from a software repository 204 to the vehicle 202. To do so, the service tool 206 may be configured to connect to the in-vehicle network 102 of the in-vehicle system 100. In many examples, the service tool 206 may be configured to connect to the in-vehicle network 102 via the diagnostic connector 108. The service tool 206 may receive a software update for the vehicle 202 from the software repository 204 via a wired connection 210 and/or a wireless connection 208 over a communication network. Alternatively, the software update may be pre-installed to the service tool 206. As examples, the service tool 206 may be implemented as various types of computing device, such as a laptop computer, a desktop computer, a tablet, a dedicated device, a car diagnostic tool/scanner, a personal digital assistance (PDA), an integrated diagnostic service (IDS) device, and/or any device that may be configured to connect to the diagnostic connector 108 and capable of downloading and providing software to the ECU 114.

The gateway device 106 may be configured to control communication between the service tool 206 and the ECU 114 through the in-vehicle network 102. Alternatively, the service tool 206 may be configured to connect to the ECU 114 via in-vehicle network 102 without connection through the gateway device 106. For instance, the service tool 206 may be configured to connect to the in-vehicle network 102 via the USB connector 116, or the wireless transceiver 118, or another vehicle connector over which the software updates can be provided.

The service tool 206 may be configured to obtain an authentication key from the ECU 114 to use to authenticate the software update. In an example, the authentication key may be a public key stored in the ECU 114 for verifying software updates signed using a corresponding private key securely maintained by publishers of the software updates. If the authentication process is successful, the service tool 206 may be configured to send the software update to ECU 114 to continue the update. If the authentication process is unsuccessful, the service tool 206 may be configured to suspend the update process and notify the user of the authentication failure. In one example, the service tool 206 may utilize a built-in screen and/or speaker to notify the user of the failure condition. Alternatively, the in-vehicle system 100 may be configured to notify the user through the user interface 112 of the infotainment system 110.

Figure 2B:
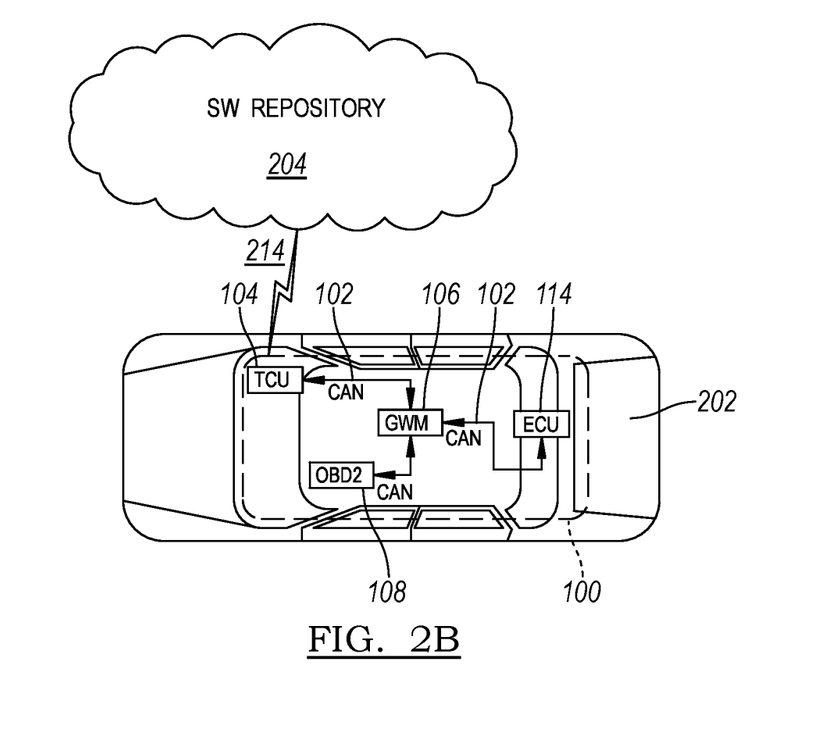
FIG. 2B illustrates an exemplary topology diagram of the in-vehicle system configured to perform an ECU update of an alternative embodiment of the present disclosure.

FIG. 2B illustrates an alternate example topology diagram of the in-vehicle system 100 configured to perform an ECU update. As compared to the example illustrated in FIG. 2A, in the example of FIG. 2B the update may be performed by the TCU 104 without a connected service tool 206. Instead, the TCU 104 may be configured to perform the role of service tool 206 and receive the software update from the software repository 204 via a wireless connection 214. As one example, the wireless connection 214 may be a cellular network. Alternatively, the wireless connection 214 may be a BLUETOOTH, a Wi-Fi connection, satellite, and/or any other wireless connections over which the software updates can be provided. The TCU 104 may be connected to the ECU 114 through the gateway device 106 via the in-vehicle network 102. Alternatively, the TCU 104 may be configured to connect to the ECU 114 via in-vehicle network 102 without connection through the gateway device 106.

In one example, the TCU 104 may be a discrete device having a cellular modem and connected to the in-vehicle network 102. Alternatively, the operations discussed herein as being performed by the TCU 104 may be performed in whole or in part by an infotainment system of the vehicle. For instance, the Ford SYNC® system developed by Ford Motor Company may utilize a paired and connected mobile phone to download, authenticate, and provide authenticated updates to the ECU 114.

Continuing with the TCU 104 example, the TCU 104 may be configured to obtain an authentication key from the ECU 114 and authenticate the software update using the authentication key. If the authentication process is successful, the TCU 104 may be configured to send the software update to ECU 114 to continue the update. If the authentication process fails, the TCU 104 may be configured to suspend the update process and notifies the user regarding the failure condition. In some examples, the TCU 104 may be configured to notify the user of the failure condition through the user interface 112 of the infotainment system 110, e.g., by use of a visual or audio alert.

Figure 3:
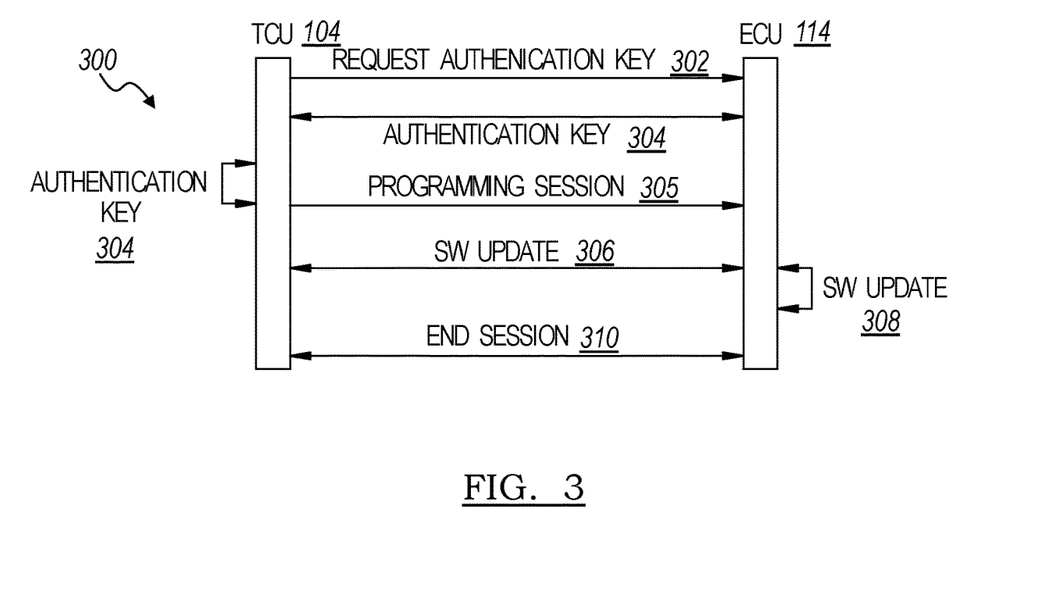
FIG. 3 illustrates an exemplary data flow diagram of the in-vehicle system configured to perform the ECU update of one embodiment of the present disclosure.

FIG. 3 illustrates an exemplary data flow 300 of operation of the TCU 104 performing a software update to the ECU 114. While in this example certain operations are discussed as being performed by the TCU 104, it should be noted that in other examples a service tool 206 connected to the diagnostic connector 108 may perform the operations indicated as being performed by the TCU 104.

The data flow 300 may begin with the TCU 104 requesting the authentication key 302 of the ECU 114 from the ECU 114 via the in-vehicle network 102. The authentication key request may be triggered responsive to input provided to the user interface 112 from a user/technician requesting initiation of the update process. In an alternative example, the TCU 104 may be incorporated into the telematics system of the vehicle 100, such that the TCU 104 may receive the user/technician input via an input device of the telematics control unit, such as a head unit display. As yet a further example, the authentication key request may be triggered by the TCU 104 or the in-vehicle system 100 automatically responsive to a determination by the vehicle 100 that the vehicle systems are not in use, such as when the vehicle 100 is parked or keyed off. It is noted that before requesting for the authentication key 302, the software update may have previously been downloaded to the TCU 104. The download may have occurred responsive to a periodic check by the TCU 104 for updated, or responsive to a user command (e.g., entered via the user interface 112).

Responsive to the request for authentication key 302, the ECU 114 may send the authentication key 304 to the TCU 104. In one example, the authentication key 304 may be a public key stored to the ECU 114 for use in authenticating digital signatures of software updates. Responsive to receiving the authentication key 304 from the ECU 114, the TCU 104 may authenticate a digital signature of the software update to determine whether the software update is authentic and unmodified. It is noted that since the authentication process is conducted in the TCU 104, and that in many cases the TCU 104 may incorporate greater computing resources than the ECU 114, more complex authentications may be able to be performed using the TCU 104 and in a shorter amount of time than approaches that use the computing resources of the ECU 114 for software update authentication.

Responsive to a successful authentication of the software update by the TCU 104, the TCU 104 initiates a programming session 305 with the ECU 114. In an example, the programming session 305 may allow unified diagnostic services (UDS) to be conducted. Additionally or alternatively, the programming session 305 may define various conditions to be met before the ECU 114 may be entered into a mode during which software updates may be applied to the ECU 114. For instance, responsive to receipt of the request from the TCU 104 to enter the programming session 305, the ECU 114 may confirm one or more conditions that are to be set for the programming session 305 to be entered. In an example, the ECU 114 may be configured to avoid entrance into the programming session 305 while the vehicle is keyed on and/or moving to ensure that the ECU 114 functionality remains available during vehicle 100 use. Responsive to entrance of the ECU 114 into the programming session 305, the TCU 104 may send the software update 306 to the ECU 114 to be applied to a memory of the ECU 114. The ECU 114 may receive the software update, and may replace the current version of software installed to the memory of the ECU 114 by the software update 306 already authenticated by the TCU 104. Responsive to the ECU 114 completing the flash of the ECU 114 memory with the new software update 306, the ECU 114 may perform an integrity-validation to verify that the software update 306 has been correctly installed. In one example, the integrity-validation may include a verification of a checksum of the software update to a checksum value provided to the ECU 114 with the software update. Responsive to successful completion of the integrity-validation, the ECU 114 may send an end session 310 message to the TCU 104 to conclude the programming session 305.

It is noted that although in this example the TCU 104 is used to update the ECU 114, other components may be used to perform the update as well, such as the service tool 206. Moreover, other components and/or parts of the in-vehicle system 100 with available computing resources and connected to the in-vehicle network 102 may be used in combination with the TCU 104 or service tool 206 to perform the validation and control of the software update to the ECU 114, in lieu of use of the computing resources of the ECU 114 to authenticate the software update.

Figure 4:
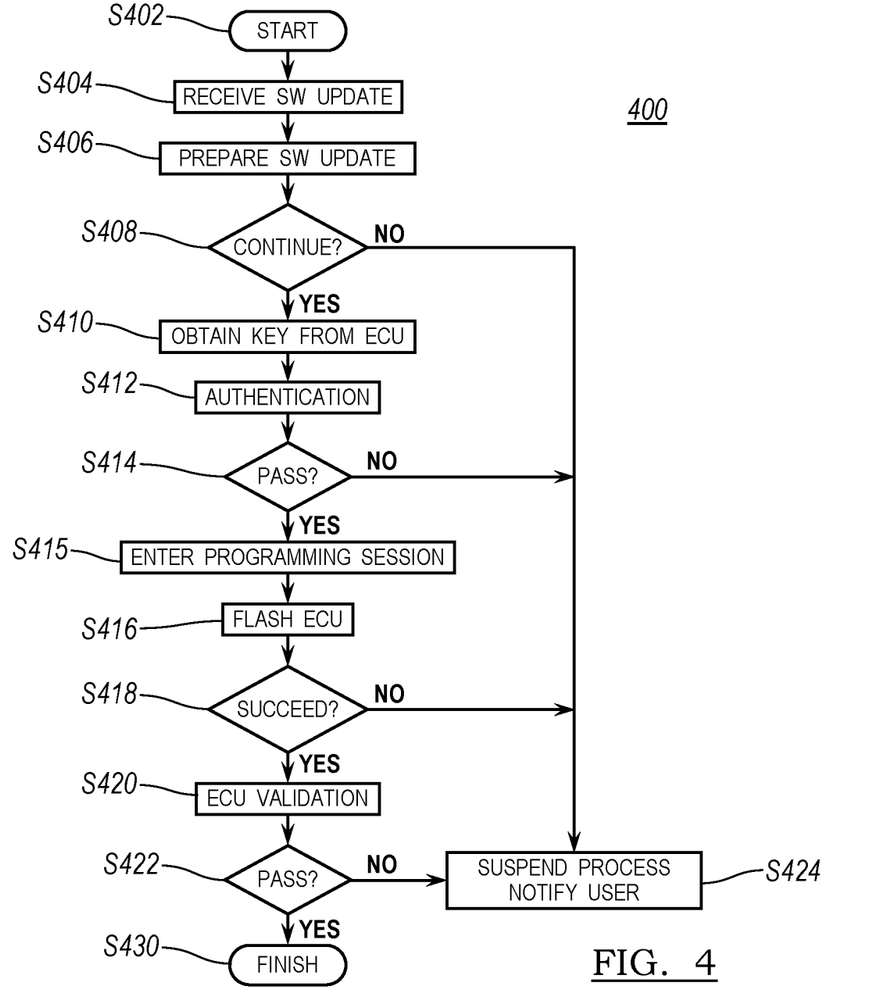
FIG. 4 illustrates an exemplary flow chart of the method performing the ECU update of one embodiment of the present disclosure.

FIG. 4 illustrates an exemplary flow chart 400 of the method for performing a software update of the ECU 114. In an example, the method may be performed by the TCU 104. nevertheless, it is again noted that in other examples, the operations of the method described as being performed by TCU 104 may be performed by the service tool 206 and/or other components and/or parts of the in-vehicle system 100.

The method may start at S402 after the TCU 104 is powered on. At S404, the TCU 104 may receive the software update from the software repository 204 via a wireless connection 214. Responsive to receipt of the software update, the TCU 104 may initiate software update query to the ECU 114. Responsive to the software update query, the ECU 114 may send to the TCU 104 a version identifier of the software that is currently installed to the TCU 104. At S406 the version identifier may be used by the TCU 104 to prepare for the update by comparing the version identifier of the software currently installed to the ECU 114 with the version of the software update, to determine whether the software update is of a higher version and therefore suitable for installation. Alternatively, the TCU 104 may acquire the version identifier of the software version currently installed to the ECU 114 in advance, e.g., as part of the periodic query by the TCU 104 for available software updates, to allow the TCU 104 to use the version identifier to query whether a more recent software version is available for download for installation to the ECU 114.

If the TCU 104 determines the software update is compatible and/or necessary, the TCU 104 may notify the user of the availability of an update. In an example the TCU 104 may provide a notification to the user via the infotainment system 110 and/or the user interface 112 to inform the user that the software update is available. Using the notification, the user may respond, e.g., via the user interface 112, and provide confirmation to continue the update S408. Alternatively, the TCU 104 may automatically perform the software update when the vehicle is not in use, such as when the car is parked and/or keyed off. If the TCU 104 or the user elects not to continue the update, the TCU 104 may suspend the update process and may notify the user regarding the unapproved status of the available software update at S424. The process may conclude at operation S430.

If the user decides to continue with application of the software update to the ECU 114, the TCU 104 may obtain the authentication key from the ECU 114 at S410. In an example, the authentication key may have been previously stored to the ECU 114 (e.g., in a read only memory of the ECU 114 during manufacture, as part of a previous software update, etc.). As another example, the authentication key may have been previously acquired from the ECU 114 (e.g., during a previous software update cycle) and maintained in a memory of the TCU 104. In such an example, at S410 the TCU 104 may determine that the authentication key is already available, and may proceed without requesting the authentication key from the ECU 114. Responsive to the TCU 104 having obtained the authentication key, the TCU 104 may perform the authentication of the software update ay S412. In one example, the TCU 104 may authenticate the digital signature of the software update to verify that the software update is authentic and has not been corrupted or tampered with (e.g., correctly signed using the private key of the software update author corresponding to the authentication key and being unavailable to other parties). In one example, the authentication process may involve one or more of digital signature scheme (DSS), an elliptical curve digital signature algorithm, and/or another asymmetric key algorithm. If the authentication process fails, the update process may be suspended and the user may be notified at S424. Since at this point in the method the software update has not yet been transferred to the ECU 114, the ECU 114 is protected from potential issues with receipt of a software update that fails. Accordingly, even if the TCU 104 downloads an unauthentic software update that brings the potential danger of damaging the vehicle and inconveniencing or stranding the user, those issues may be avoided by the current method.

If the authentication succeeds, the process proceeds and the ECU 114 may enter into the programming session S415 to receive the software update. In the programming session, the TCU 104 may cause the ECU 114 to replace the current version of software with the updated software at S416. In general, the flashing step is stable and safe with the authentic software updates. However, in case that the flashing step fails for any reasons such as a communication breakdown, the TCU 104 may, responsive to the communication issue, suspend the update process and notify the user of the failure at S424. In such a situation, the user may choose to restart the update process from Step S405 as the software has already been downloaded into the TCU 104. Alternatively, the user may be provided with an option to restart from Step S416 to re-flash the already authenticated software update. As a further possibility, the user may also be given an option to restart the process from the beginning S402.

If the flashing step S416 succeeds, the ECU 114 may perform an integrity-validation to verify that the software update is properly installed at S420. In one example, the integrity-validation may be a checksum calculation. Example checksums for use in such a validation may include CRC, MD5, SHA1SUM, or SHA2SUM, as some non-limiting possibilities. If the ECU integrity-valuation step S420 fails, the software update is not properly installed and ECU 114 may notify the user of the failure S424. if such a failure occurs, the user may choose to restart the process. If the installed software update passes the validation at step S422, the TCU 104 may optionally indicate to the user that the update process has been successful, and the process ends S430.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A method comprising:
   initiating a programming session of a vehicle electronic control unit (ECU) by a service tool in communication with the ECU over a diagnostic port connection to a vehicle bus;

authenticating, by the service tool, a software update for the ECU using an authentication key received to the service tool from the ECU; and responsive to successful authentication, sending the software update from the service tool over the vehicle bus to the ECU.

2. The method of claim 1, further comprising:

requesting the authentication key over the vehicle bus from the ECU by the update device; and validating a checksum of the software update by the ECU responsive to receipt of the software update by the ECU.

3. The method of claim 1, further comprising generating a notification indicating a result of the authenticating.

4. The method of claim 1, wherein the authenticating comprises authenticating a digital signature of the software update using the authentication key, the authentication key being a public key, the digital signature being applied to the software update by an originator of the software update using a private key corresponding to the authentication key.

5. The method of claim 1, further comprising:

determining an update version of the software update;

determining a current version of the software installed in the ECU;

comparing the update version with the current version to obtain a comparison result; and based on the comparison result, identifying whether to request the authentication key from the ECU by the update device.

6. The method of claim 5, further comprising outputting a message based on the comparison result.

7. The method of claim 1 further comprising requesting an authentication key from the ECU by the update device in response to an update version of the software update not matching a current version of the software installed in the ECU.

8. The method of claim 1, wherein the update device is connected to the vehicle bus of the vehicle using an On-Board Diagnostic 2 (OBD2) connector.

9. The method of claim 1, further comprising receiving the software update using a Telematics Control Unit (TCU) over a wireless link.

10. The method of claim 9, wherein the update device is the TCU.

11. A vehicle system comprising:

a Telematics Control Unit (TCU) connected to an in-vehicle network, configured to receive a software update for an Electronic Control Unit (ECU) over a wireless network;

initiate a programming session with the ECU via the in-vehicle network;

authenticate the software update using an authentication key received from the ECU via the in-vehicle network to obtain an authentication result; and responsive to the authentication result indicating successful authentication, send the software update over the in-vehicle network to the ECU to cause the ECU to flash a memory of the ECU with the software update.

12. The vehicle system of claim 11, wherein the TCU is further configured to obtain the authentication key from the ECU from a memory of the TCU, wherein the authentication key is stored to the memory from application of a previous software update from the TCU to the ECU.

13. The vehicle system of claim 11, wherein the TCU is further configured to display a notification indicating the authentication result.

14. The vehicle system of claim 11, wherein the TCU is further configured to authenticate a digital signature of the software update using the authentication key, the authentication key being a public key, the digital signature being applied to the software update by an originator of the software update using a private key corresponding to the authentication key.

15. The vehicle system of claim 11, wherein the TCU is further configured to determine an update version of the software update before receiving it;

determine a current version of software that is currently installed in the ECU;

compare the update version with the current version to obtain a comparison result; and based on the comparison result, decide whether to receive the software update.

16. The vehicle system of claim 11, wherein the TCU is further configured to reject the software update in response to an update version of the software being incompatible with a current version of the software installed in the ECU.

17. The vehicle system of claim 11, wherein the wireless network is at least one of a cellular network, a Wi-Fi network, or a Bluetooth network.

18. An apparatus for flashing software of an Electronic Control Unit (ECU) of a vehicle, comprising:

a connector configured to couple the apparatus to an in-vehicle network of the vehicle;

a memory configured to store an Electronic Control Unit (ECU) software update; and a processor configured to initiate a programming session to the ECU via the connector;

authenticate the ECU software update using an authentication key to obtain an authentication result; and when the authentication result indicates successful authentication, send the ECU software update over the in-vehicle network to the ECU to cause the ECU to flash with the ECU software update.

19. The apparatus of claim 18, further comprising a communication device configured to download the ECU software update.

20. The apparatus of claim 18, wherein the processor is further configured to authenticate a digital signature of the software update using the authentication key, the authentication key being a public key, the digital signature being applied to the software update by an originator of the software update using a private key corresponding to the authentication key.

21. The apparatus of claim 18, wherein the processor is further configured to determine to obtain the authentication key from the ECU responsive to determining that a version of the ECU software update is greater than a current version of the software installed to the ECU.

* * * * *